(12) United States Patent
Eiermann et al.

(10) Patent No.: US 6,227,179 B1
(45) Date of Patent: May 8, 2001

(54) V-TYPE INTERNAL COMBUSTION ENGINE WITH A MECHANICALLY DRIVEN SUPERCHARGER

(75) Inventors: Georg Eiermann, Fellbach; Erhard Rau, Weilheim, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/390,661

(22) Filed: Sep. 7, 1999

(30) Foreign Application Priority Data

Sep. 5, 1998 (DE) .............................................. 198 40 616

(51) Int. Cl.$^7$ ...................................................... F02B 29/04
(52) U.S. Cl. ............................................................... 123/563
(58) Field of Search ................................. 60/599; 123/563

(56) References Cited

U.S. PATENT DOCUMENTS 2,498,152 * 2/1950 Burks et al. .......................... 123/563
4,028,892 6/1977 Hinkle .
6,006,540 * 12/1999 Coletti ..................................... 60/599
6,079,394 * 6/2000 Abthoff et al. ....................... 123/563

FOREIGN PATENT DOCUMENTS 0 529 639 B1 3/1993 (EP) .

* cited by examiner

Primary Examiner—Michael Koczo
(74) Attorney, Agent, or Firm—Evenson, McKeown, Edwards & Lenahan, P.L.L.C.

(57) ABSTRACT

A V-type internal combustion engine has a mechanically driven supercharger located essentially between the V-shaped cylinder banks of the engine. In addition, an intercooler is located downstream of the supercharger and has an intake plenum on the outlet side, which is connected by intake pipes with the air intakes of the cylinders of both cylinder banks. In order to provide an internal combustion engine with compact, easily managed mechanical supercharging, characterized by agile response, the supercharger and the intercooler form a preassembled module. The supercharger is located above the intercooler in the installed position, and the intake plenum is located on top of the intercooler but below the supercharger between the V-shaped cylinder banks.

20 Claims, 2 Drawing Sheets

V-TYPE INTERNAL COMBUSTION ENGINE WITH A MECHANICALLY DRIVEN SUPERCHARGER This application claims the priority of application Ser. No. 198 40 616.9-13, filed in Germany on Sep. 5, 1998, the disclosure of which is expressly incorporated by reference herein.

BACKGROUND OF THE INVENTION

The present invention relates to a V-type internal combustion engine with a mechanically driven supercharger, and more particularly, to an engine with a supercharger located essentially between V-shaped cylinder banks of engine, with an intercooler located downstream of supercharger. The intercooler has an intake plenum on the outlet side, and the plenum is connected by intake pipes with the air intakes of the cylinders of both cylinder banks. The supercharger and intercooler form a preassembled module, with the supercharger being located above the intercooler in the installed position, and the intake plenum being located on the top of the intercooler but below the supercharger between V-shaped cylinder banks.

An engine is described in EP 0 529 639 B1 in which a supercharger driven mechanically by the crankshaft is located between the two banks of cylinders of the engine arranged in a V. The supercharger compresses the combustion air drawn in to an increased boost pressure. An intercooler is located above the supercharger, in which the compressed boost air is cooled downstream of the supercharger. The cooled boost air is supplied to the air intakes of the cylinders through the intake pipes.

The two banks of cylinders each have an intake plenum associated with them, each plenum being connected by connecting tubes with the intercooler and supplied with boost air. The two intake plenums run in the lengthwise direction of the cylinder banks above the cylinder heads. The intake pipes to the air intakes of the cylinders branch off from the intake plenums.

This mechanical supercharging system consists of a plurality of individual parts which are assembled when the engine is built and whose functional reliability can only be tested after assembly is complete. As a result, malfunctions of individual parts result in final adjustments that cost both time and money, and prevent completion of the engine.

Another disadvantage is that a plurality of long connecting tubes is necessary to conduct the combustion air between the supercharger, the intercooler, the intake plenums, and the air intakes of the cylinders, resulting in long flow paths with corresponding losses and delayed dynamics. Long response times result, especially during non-steady-state operation of the engine. In addition, the system requires considerable space and is unwieldy to assemble.

Another V-engine is described in U.S. Pat. No. 4,028,892, which likewise teaches a supercharger between the cylinder bands, located above an intercooler, fastened at the bottom of the V between the cylinder banks. After the intake air has flowed through the intercooler, it is fed to an air chamber which communicates with the air intakes of the cylinders. The air chamber is integrated into the engine block and encloses the cylinders of the engine. This design is characterized by a relatively complex design and a high manufacturing cost.

SUMMARY OF THE INVENTION

An object of the invention is to provide an internal combustion engine with compact, easily handled mechanical supercharging characterized by nimble response.

This object has been achieved according to the invention by providing that the supercharger and the intercooler form a preassembled module, with the supercharger being located above the intercooler in the installed position, and the intake plenum being located on the top of the intercooler but below the supercharger between the V-shaped cylinder banks.

The supercharger and intercooler form a preassembled module that can be tested for its functional reliability before it is installed in the engine, so that any defects that may be present can be found immediately and costly finishing work is eliminated. The diversity of the parts is reduced, and assembly of the module in the engine is much simpler and faster. In addition, the integration of the supercharger and the intercooler into a common module requires much less space, so that this supercharging system can be used even for small engines.

Another advantage is that the intercooler is located beneath the supercharger and has an intake plenum located on top, between the intercooler and the supercharger. The intake plenum is located in the center between the two banks of cylinders, so that the cylinders in each bank are supplied with boost pressure by a single intake plenum. The centrally located intake plenum is also advantageously located at approximately the same level as the air intakes of the cylinders, so that short intake pipes suffice between the outlet of the intercooler and the cylinder air intakes. The central intake plenum and the short intake pipes also minimize frictional and flow losses, and have a positive effect on the dynamics of the system, while the response of the supercharging system is improved.

The air intake of the intercooler is advantageously configured as an air injection manifold on the underside of the intercooler. The air injection manifold is connected with the supercharger or compressor and supplied with boost air through a boost air line that leads downward and is guided through a central recess in the intercooler and downward to the air intake of the intercooler. This configuration guarantees the shortest possible connection between the intake plenum and the cylinder air intakes.

The boost air line can be located on the preassembled module, consisting of the supercharger and the intercooler, producing a completely prefabricated module that can be installed and replaced. The intake pipes can also be part of the prefabricated module.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
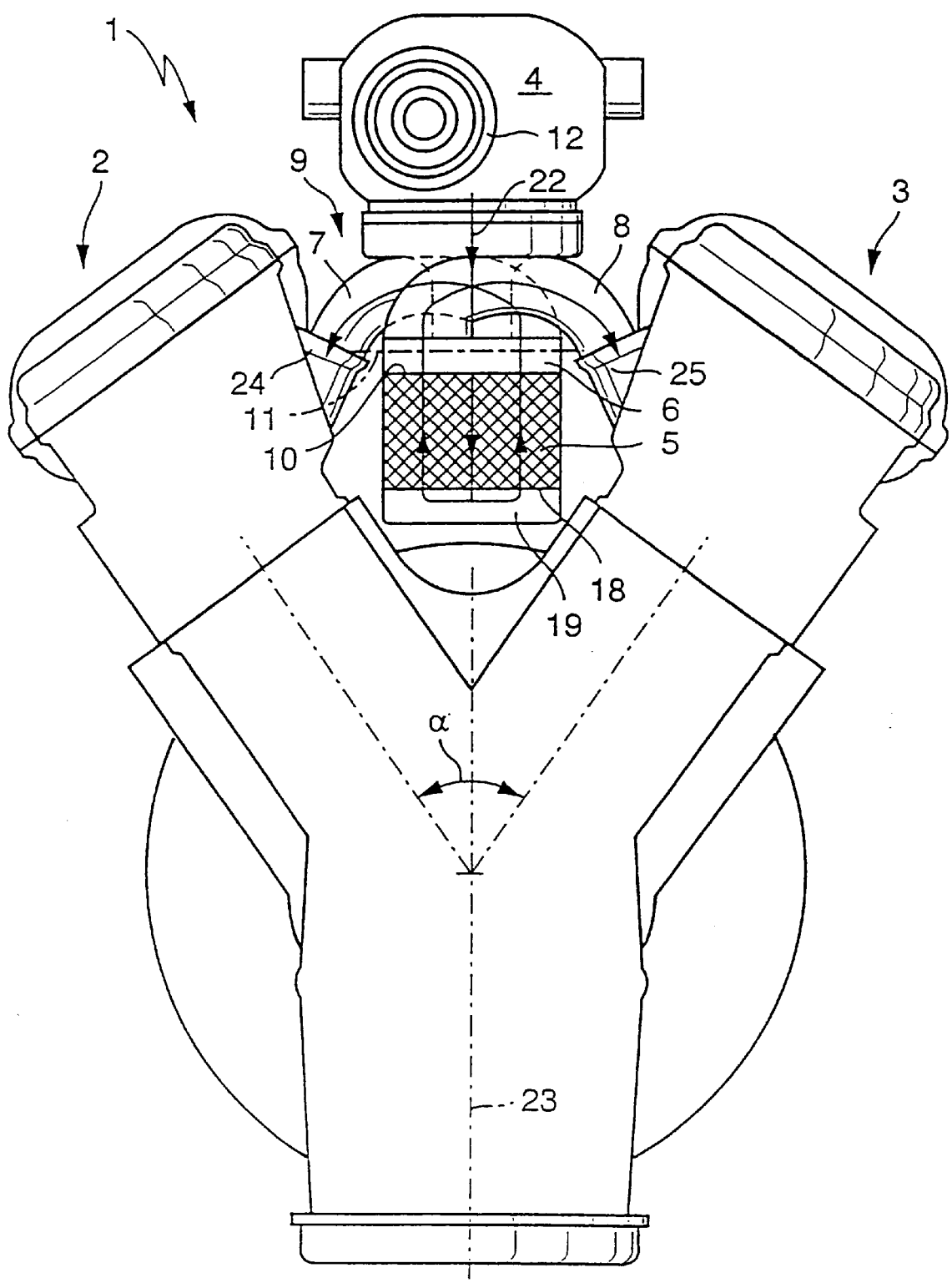
FIG. 1 is a front view of a V-type internal combustion engine with a mechanical supercharger embodying the present invention.

According to FIG. 1, engine 1 has two banks of cylinders 2, 3 arranged in a V configuration, which enclose an angle α of at least approximately 60 degrees, approximately 70 degrees in the illustrated embodiment. The two banks of cylinders 2, 3 are located mirror-symmetrically to a vertical lengthwise central plane 23 of the engine, and the total number of cylinders in the embodiment is six. However, the number of cylinders however can also be eight, ten, or twelve.

The engine 1 has a mechanical supercharger or compressor 4 driven by the crankshaft, which compresses combustion air to an elevated boost pressure which is supplied to the intake of the cylinders to increase the power and torque. As shown, the supercharger 4 is supplied with the combustion air through a horizontal air supply line 12 that is located on the opposite side of a drive pulley 13 for the supercharger 4.

Following compression in the supercharger 4, the boost air is conducted in the direction indicated by arrow 22 downward to an intercooler 5 located below supercharger 4. The intercooler is located adjacent to the bottom of the V between the two cylinder banks 2, 3. The boost air is guided through a recess in intercooler 5 upstream of an air distributor or injection manifold 19 in the vicinity of the underside 18 of the intercooler 5 and from there conducted uniformly upwardly through the cooling area of the intercooler 5 for cooling.

An engine intake plenum 6 on the top 10 of the intercooler 5 is arranged so that the cooled boost air flows therethrough. Intake plenum 6 is thus located between the supercharger 4 located on top and the intercooler 5 located beneath, but it forms a part of the intercooler 5. The intake plenum 6 is connected by intake pipes 7, 8 with the cylinder intakes 24, 25 in the vicinity of the two cylinder banks 2, 3.

The supercharger 4 and the intercooler 5 form a structural unit 9 that is preassembled and tested for functional reliability and then installed between cylinder banks 2, 3 with the supercharger 4 above and with the intercooler 5 below. The unit 9 also includes the air injection manifold 19 located on the intake side of the intercooler 5 on the bottom and the intake plenum 6 on the outlet side on top. Advantageously, the intake pipes 7, 8 are preassembled on the unit 9 as well. The supercharger 4 and the intercooler 5 are configured and mounted symmetrically to the lengthwise central plane 23.

The intake plenum 6 and the cylinder air intakes 24, 25 in the vicinity of the two cylinder banks 2, 3 lie in a horizontal plane 11 that runs perpendicularly to the lengthwise central plane 23 so that intake pipes 7, 8 must bridge only a horizontal distance between the intake plenum 6 and the cylinder air intakes 24, 25.

Figure 2:
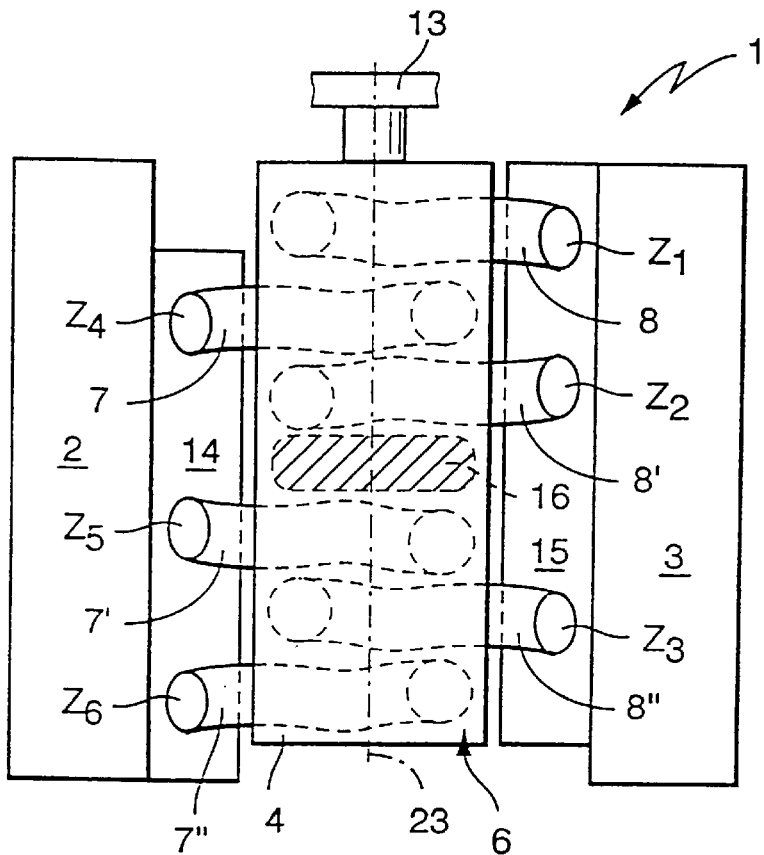
FIG. 2 is a top view of the engine of FIG. 1.

As shown in FIG. 2, the engine is a V-6 engine, in which each cylinder bank 2, 3 has three cylinders Z1, Z2, Z3 and Z4, Z5, Z6, respectively. Supercharger 4 extends in the lengthwise direction of the engine, with the lengthwise direction of the engine simultaneously lying in a lengthwise central plane 23. The drive pulley 13 is provided at one end of the supercharger as a pulley for a belt and is driven by a belt, not shown, from the crankshaft.

Depending on the number of cylinders, six intake pipes 7, 7', 7" and 8, 8', and 8" are provided which connect the intake plenums 6 between the supercharger 4 and the intercooler 5 with the cylinders Z1 to Z6. Immediately adjacent intake pipes are conducted to opposite cylinder banks 2, 3. The intake pipes 7, 7', and 7" that run to the cylinder bank 2 are connected on the side facing the opposite cylinder bank 3 with the intake plenum 6; correspondingly, the connection between intake pipes 8, 8' and 8" and the intake plenum 6 is located in the vicinity of the side of the intake plenum facing cylinder bank 2, so that adjacent intake pipes branch off from intake plenum 6 on both sides of the lengthwise central plane 23. As a result of this arrangement, as shown in FIG. 1, there is a slightly greater horizontal distance between an outlet of the intake plenum 6 and the associated cylinder, which allows the curvature of the corresponding intake pipe to be kept smaller and creates a more uniform flow profile in the intake pipe.

FIG. 2 also shows that each cylinder bank 2, 3 has an intake flange 14, 15 associated with it, in which the intake pipes 7, 7', 7" and 8, 8', 8" terminate. The boost air is supplied to the cylinder intakes of the individual cylinders through the intake flanges 14, 15.

Figure 3:
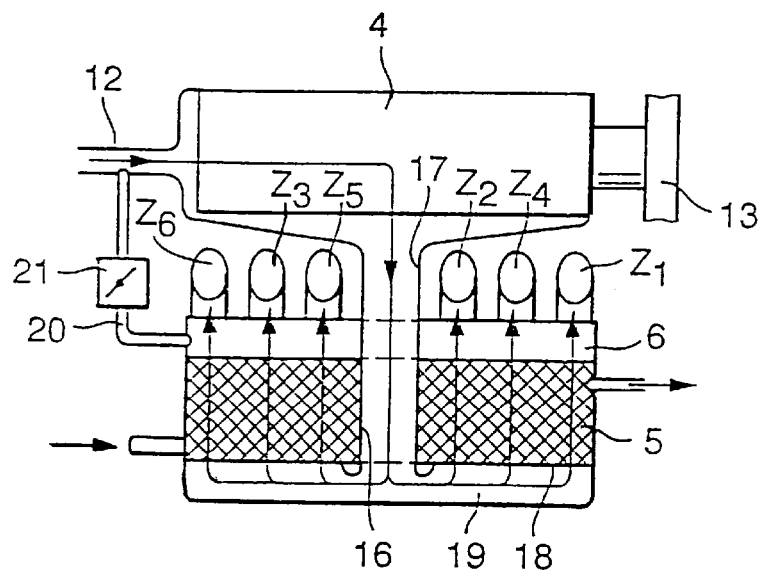
FIG. 3 is a side view of the engine of FIG. 1.

In the intercooler 5, a vertical recess 16 is provided below the supercharger 4, and, as viewed in the lengthwise direction of supercharger 4, is located between the third and fourth intake pipes, centrally in the middle of the supercharger 4 or the intercooler 5. According to FIG. 3, the recess 16 extends through the intake plenum 6 and the entire height of the intercooler 5 up to the air injection manifold 19. A boost air line 17 is fed through the recess 16, through which the boost air compressed in the supercharger 4 is conducted vertically downward into the air injection manifold 19 of the intercooler 5. From the air injection manifold 19, the boost air flows upward through the intercooler 5, is cooled in the intercooler 5, and ends up in the intake plenum 6 on top of the intercooler 5.

The intercooler 5 is a water-air intercooler which uses water as the coolant. The coolant is conducted horizontally in the lengthwise direction of the engine through the intercooler 5. The flow direction of the coolant runs in the same direction as the inward flow of the combustion air through the air supply line 12 into the supercharger 4; the flow of the coolant can also be in the opposite direction.

From the air supply line 12, which is located on the side of the supercharger 4 opposite the drive pulley 13, a bypass 20 to intake plenum 6 branches off upstream of the supercharger 4. The bypass 20 can be closed by a shutoff valve 21. With the shutoff valve 21 in the open position, the supply line 12 communicates directly with intake plenum 6, so that combustion air under atmospheric pressure is supplied to the intake plenum 6. This arrangement is advantageously implemented when the throttle valve of the engine is located upstream of the supercharger 4. However, it is also advantageous to locate the engine throttle valve in the boost air line 17 guided vertically downward through the intercooler 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A V-type internal combustion engine with a mechanically driven supercharger located essentially between V-shaped cylinder banks, an intercooler located downstream of the supercharger and having an engine intake plenum on an outlet side thereof, said plenum being connected by intake pipes with air intakes of cylinders of the cylinder banks, wherein said supercharger and said intercooler form a preassembled module, and said engine intake plenum is located between said intercooler and said supercharger and between the cylinder banks.

2. The engine according to claim 1, wherein a boost air line is guided between said supercharger and said intercooler to an injection manifold of said intercooler located on a side of said intercooler.

3. The engine according to claim 2, wherein said boost air line is guided between said supercharger and said intercooler through a central recess in said intercooler.

4. The engine according to claim 1, wherein a bypass configured to bridge said supercharger and having means to be closed off is arranged between an air supply line to said supercharger and said intake plenum of said intercooler.

5. The engine according to claim 4, wherein a boost air line is guided between said supercharger and said intercooler to an inner injection manifold of said intercooler located on a side of said intercooler.

6. The engine according to claim 5, wherein said boost air line is guided between said supercharger and said intercooler through a central recess in said intercooler.

7. The engine according to claim 1, wherein adjacent intake pipes are guided between said intake plenum of said intercooler and said air intakes of cylinders alternately to each of the cylinder banks.

8. The engine according to claim 7, wherein said boost air line is guided between said supercharger and said intercooler through a central recess in said intercooler.

9. The engine according to claim 5, wherein said boost air line is guided between said supercharger and said intercooler through a central recess in said intercooler.

10. The engine according to claim 9, wherein a bypass configured to be closed off and to bridge said supercharger is arranged between an air supply line to said supercharger and said intake plenum of said intercooler.

11. The engine according to claim 4, wherein said air supply line for said supercharger is located on a side opposite a drive pulley thereof.

12. The engine according to claim 1, wherein said intake plenum of said intercooler and said air intakes of a cylinder of the cylinder banks lie approximately in a common horizontal plane.

13. The engine according to claim 1, wherein an angle between the V-shaped cylinder banks is at least 60 degrees.

14. The engine according to claim 1, wherein said intercooler is so configured that a flow direction of coolant runs therethrough in a lengthwise direction of the engine.

15. The engine according to claim 14, wherein an angle between the V-shaped cylinder banks is at least 60 degrees.

16. The engine according to claim 15, wherein said intake plenum of said intercooler and said air intakes of a cylinder of the cylinder banks lie approximately in a common horizontal plane.

17. The engine according to claim 16, wherein said air supply line for said supercharger is located on a side opposite a drive pulley thereof.

18. The engine according to claim 17, wherein a boost air line is guided between said supercharger and said intercooler to an inner injection manifold of said intercooler located on an underside of said intercooler.

19. The engine according to claim 18, wherein said boost air line is guided between said supercharger and said intercooler through a central recess in said intercooler.

20. The engine according to claim 19, wherein a bypass configured to be closed off and to bridge said supercharger is arranged between an air supply line to said supercharger and said intake plenum of said intercooler.

* * * * *